Nov. 21, 1944.   M. GOLDSCHMIDT   2,363,469
FLEXIBLE COUPLING, FLEXIBLE MOUNTING, AND THE LIKE
Filed Dec. 15, 1943   2 Sheets-Sheet 2
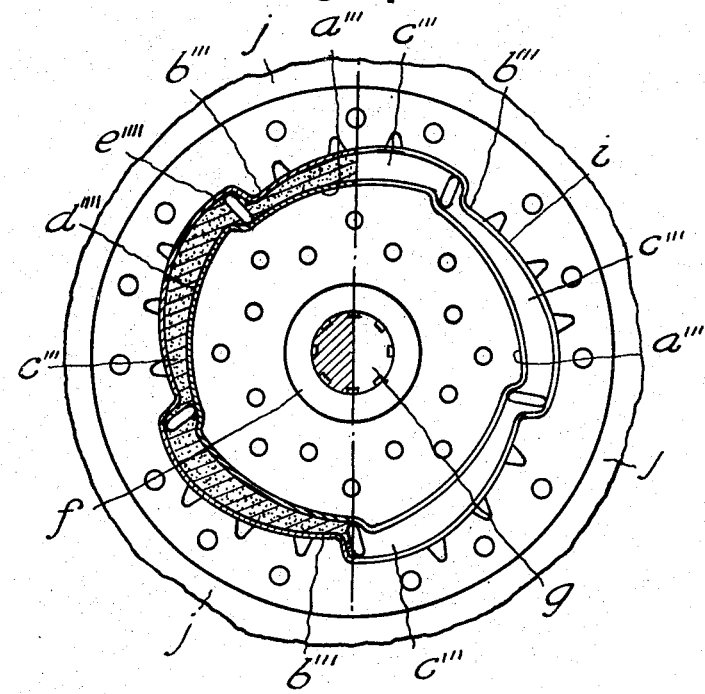
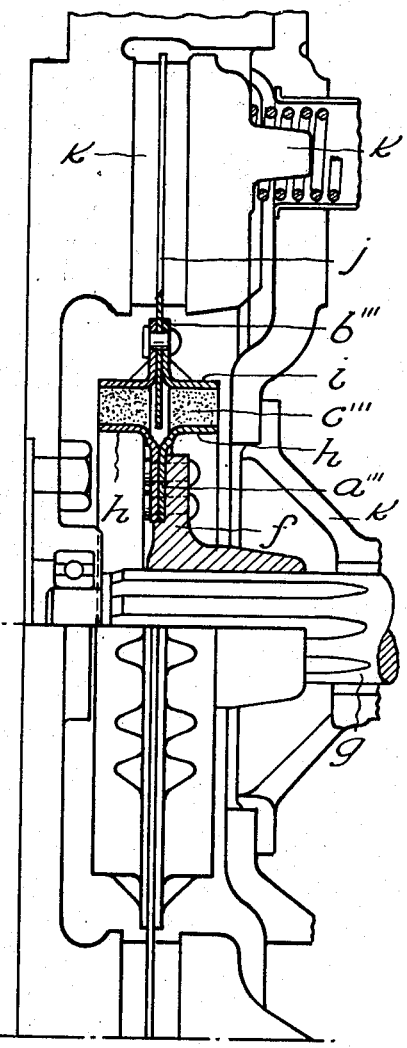
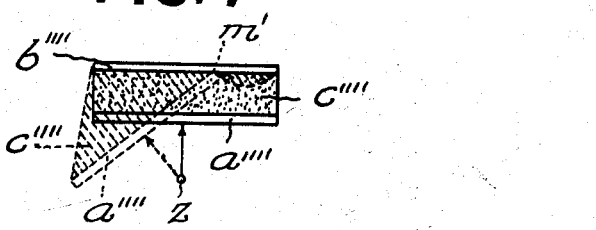
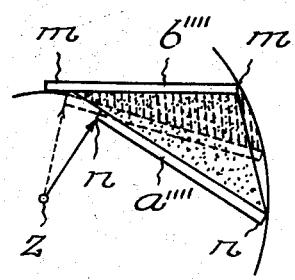
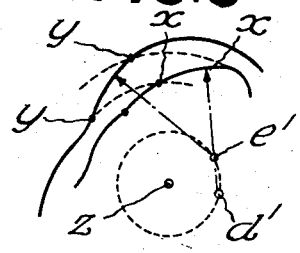
Inventor
Max Goldschmidt
By Harness Dickey & Pierce
Attorneys Patented Nov. 21, 1944

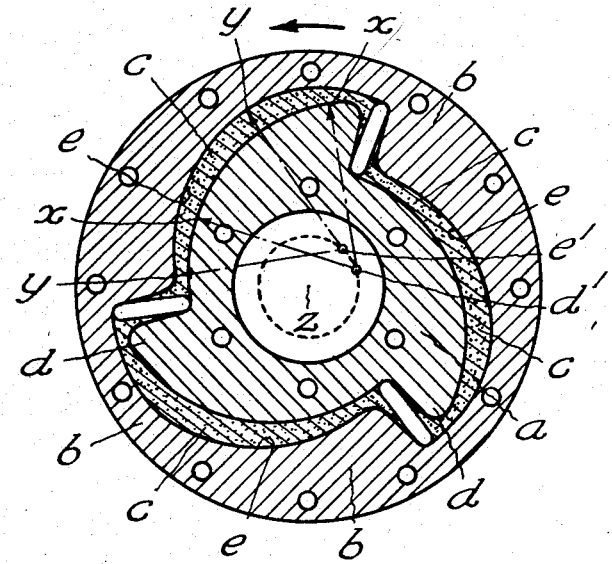
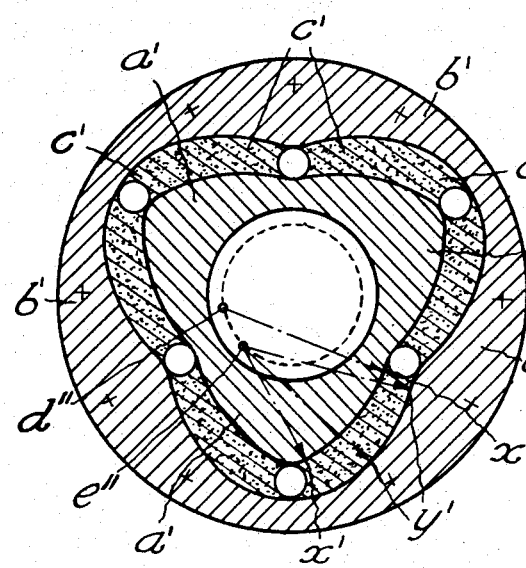
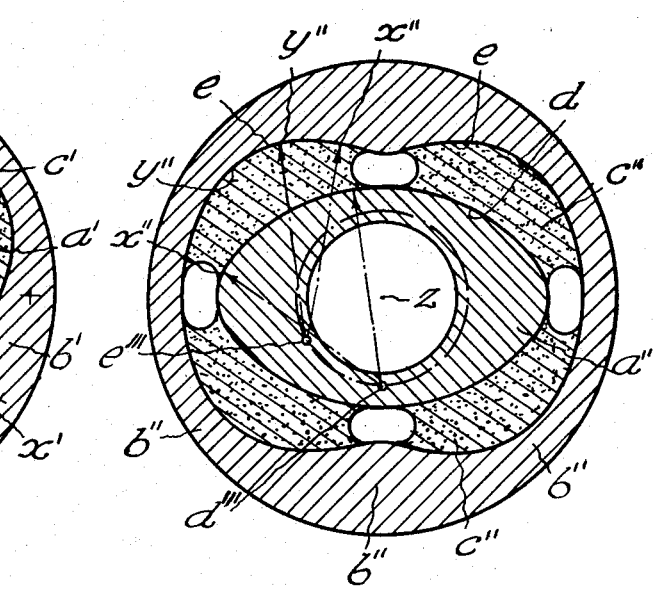

2,363,469

UNITED STATES PATENT OFFICE 2,363,469

FLEXIBLE COUPLING, FLEXIBLE MOUNTING, AND THE LIKE

Max Goldschmidt, Leicester, England, assignor to Metalastik Limited, Leicester, England, a British company Application December 15, 1943, Serial No. 514,391
In Great Britain September 1, 1942

12 Claims. (Cl. 64—11)

In couplings and mountings depending for their flexibility on the incorporation of rubber between the members to be coupled, or the instrument or object to be mounted and its support, it is often desirable that there should be low resistance to small deflections and a progressively increasing resistance as the amplitude of the deflection increases.

Such a result cannot be achieved in couplings and mountings where the rubber is stressed only in shear as the load deflection characteristic in shear is linear; but in compression the rubber will have a load deflection characteristic which is non-linear and becomes progressively steep. However, the elastic modulus of rubber in compression is much higher than with rubber in shear so that a coupling or mounting in which the rubber is used under pure compression will not give the low stiffness for the small deflections.

Couplings are well known in which a rubber disc is the elastic element and is bonded on each face to a disc-like surface on one of the members to be coupled and as under torsion, if the lateral surfaces of the discs are planar, the rubber is stressed solely in shear and the rubber may then break down, it has been proposed to wave the lateral surfaces of the discs at such a curve that only compressive stress is exerted on the rubber disc.

Couplings have also been proposed in which the rubber element is arranged between an inner and an outer member and is bonded to each to couple them elastically for rotation, and in these couplings various complementary, curved, or inclined, forms have been given to the inner and outer members at the bonded surfaces such as elliptical, triangular, star-shaped and the like. In constructions in which the inner member has outward projections it has been proposed to provide cavities in the elastic material beyond the vertices of the inner member or between the latter and the casing so that these parts which are not subjected to compressive stress yield more readily in shear and equalise the forces in the mass.

In these previous proposals in this art the effective surfaces of the co-operating metal members of the coupling are concentric curves or parallel planes in the position in which the elastic element is not deflected.

In the present invention the operative or mating lobes of the co-operating members of the coupling between which the elastic material is arranged (or the effective parts of such members) have mating contours which are substantially the same but relatively displaced circumferentially so that if one mating lobe is turned about the axis of the coupling relative to the other in one direction sufficiently, it would substantially coincide with the other.

Since it is an advantage in this type of couplings having complementary projecting and receding parts inter-layered with the elastic material that metallic overlap or engagement between the parts should be provided for as a safety feature, the co-relation of the effective parts of the surfaces which this invention provides gives the advantage of what may be termed "area interference" between the metal parts instead of "point" or "line interference" which latter leads to high local stressing of the intervening rubber.

Relative movement between the members under increased torsional load brings upon the elastic element an increasing compressive load so that resistance to deflection of the element increases, whereas under light torsional load the elastic element offers low resistance to deflection.

Examples of couplings embodying the invention are given in the accompanying drawings and are hereinafter described, and diagrams are included to facilitate explanation of the manner of working of the invention.

In these drawings:

Figure 1 is a transverse sectional view through a pair of co-operating members coupled by an elastic element constructed in accordance with the invention.

Figures 2 and 3 are similar views to Figure 1 illustrating the application of the invention to other designs of co-operating coupling members.

Figure 4 shows partly in section and partly in end elevation the application of the invention as an elastic coupling between a clutch centre and the clutch plate or plates.

Figure 5 is a longitudinal sectional view of the clutch arrangement illustrated in Figure 4.

Figure 6 is a fragmentary diagrammatic view showing the method of generating the co-related surfaces of the operative or mating lobes of the coupling members.

Figures 7 and 8 are diagrammatic views illustrating an advantage of co-relating the effective parts of the surfaces of the mating lobes of the coupling.

In a convenient embodiment mainly intended for use in a flexible coupling (but capable of use with slight modification of the attachment parts also as an engine, or other, mounting designed to take torque reactions), we provide an annular member with a series of eccentrically curved concave faces forming its inner face which concave curved faces are struck from centres symmetrically off-set from the axis of the annulus, the outermost end of one curve being connected by a shoulder or step with the innermost end of the next succeeding curve. Inside this annular member and radially spaced from it is a ratchet-wheel-like member with its periphery comprising a corresponding number of convexly curved surfaces. The rubber element comprises a number of pads each bonded on the outer face to a concavely curved face of the annulus and at its inner face to a corresponding convexly curved face of the wheel-like inner member.

The unstressed condition of the rubber should correspond to a relative angular position of the annulus and the wheel-like inner members in which each concave face is in its most remote position from its co-operating convex face. In this position there is a space in a circumferential direction between the metallic steps or shoulders of the respective parts, and it is preferred that this space shall be free from rubber or free except for rubber cushion blocks or skins. Small loads coming on the metallic members in torsion in one direction of rotation find the rubber elements yield freely in practically pure shear, whereas any load tending to cause a large deflection in that direction causes the curved faces to approach each other with powerfully increasing compressive effect on the rubber pads and correspondingly increasing stiffness therein for resisting deflection. Two examples of this embodiment are given in Figures 1 and 4 of the drawings.

In Figure 1 $a$ is an inner metallic member of a coupling, $b$ is an outer co-operating member and $c$ is the rubber elastic element bonded between these metal members. The operative surfaces of these co-operating parts $a$ and $b$ are referred to as lobes, and these lobes are three in number, those of the inner member being referred to by the letter $d$, and those on the outer member by the letter $e$. The surface of the lobe $d$, i. e., the effective part between $x$—$x$, is generated from the centre $d^1$ on the dotted circle about the axis $z$ of the coupling; and the surface of the complementary lobe $e$, i. e., the effective part of it between $y$—$y$ is generated by the same dimension, but from a displaced centre $e^1$ on the same circle around the axis $z$. The shape of the parts outside the points $x$—$x$ and $y$—$y$ on the lobes $d$ and $e$ respectively are of less importance and other curves may be used for them, since in the relative movement of the lobes, the rubber at these parts has no backing from the opposing metal parts.

The drive in Figure 1 is assumed to be anti-clockwise, with the inner member constituting the driving member.

The examples illustrated in Figures 2 and 3 are constructed on the same principles as that shown in Figure 1; but they are designed for conditions in which a reverse drive may be required. In Fig. 2, parts corresponding to similar parts $a$, $b$ and $c$ in Fig. 1 are identified by the letters $a'$, $b'$, $c'$. Generating points corresponding to $d'$ and $e'$ in Fig. 1 are indicated at $d''$ and $e''$ in Fig. 2. Surface portions corresponding to $x$—$x$ and $y$—$y$ in Fig. 1 are indicated at $x'$—$x'$ and $y'$—$y'$ in Fig. 2.

In Fig. 3 surface portions and parts corresponding to $a$, $b$, $c$ in Fig. 1 are indicated at $a''$, $b''$ and $c''$ in Fig. 3. Generating points are indicated at $d'''$ and $e'''$ and curved mating lobe surface portions are indicated at $x''$—$x''$ and $y''$—$y''$.

In Figure 4 the number of lobes on the inner member $a'''$ is increased so that the eccentricity of the effective surface of each lobe $d''''$ and $e''''$ is reduced to enhance the shear characteristic with considerable freedom of deflection in the low load condition whilst preserving the area over which there is interference between the mating metal lobes disposing the compressive loading of the rubber, and the consequent reduction of stress under increased load and greater deflection as compared with point or line interference.

In this figure and Figure 5 the inner member $a'''$ is made up of two flanged discs secured together and secured to a hub part $f$ splined or otherwise secured to the shaft $g$. The outwardly flanged parts $h$ are shaped to form the lobes $d''''$ (Figure 4) and have the rubber elements $c'''$ bonded to them and the outer faces of the elements $c'''$ are bonded to flanged parts $i$ of two flanged rings which are secured together to form the outer member $b'''$ carrying the lobes $e''''$ (Figure 4). The clutch plate $j$ is rivetted between the two flanged rings which form the member $b'''$ of the coupling. The clutch housing and friction faces for engaging the clutch plate $j$ are referred to by the letter $k$ and may follow on any suitable lines.

The same principles of forming the co-operating lobes $d''''$ and $e''''$ of the inner member $a'''$, formed in this example by the parts $h$, and the outer metal member $b'''$, formed in this example by the rings $i$, apply as in the earlier examples of construction. Reference may be made to the diagrammatic fragmentary view, Figure 6, where the method of generating the curved surfaces $x$—$x$ of one of the lobes $d$ of the inner member from $d^1$ and of $y$—$y$ of a lobe of the outer member from $e^1$, with $d^1$ and $e^1$ having the same reference to the common centre $z$ can be clearly seen.

The diagrammatic views, Figures 7 and 8, show the effect of "area interference" as against "line" or "point" interference between the metal lobes. Straight line or plate members are represented and in Figure 7 the inner member $a''''$ moving concentrically about the coupling axis $z$ makes line contact at one end, under extreme stress conditions, on the plate $b''''$ at $m^1$, the line being parallel with the coupling axis $z$. Full lines illustrate the normal unloaded position and dotted lines show the extreme deflected condition. This "line" metal to metal interference tends to produce high load stressing and, under extreme conditions, such heating as may possibly cause failure.

In Figure 8 no such "line" or "point" of metallic interference occurs as the ends $m\ m$ and $n\ n$ of the plates (or effective surfaces) are coincident about their axis of movement $z$; compare also Figure 6.

This principle of area interference places no limitation on the particular contour of the lobes, provided the mating contours are substantially the same but circumferentially displaced relatively so that if one were turned about the axis of the coupling sufficiently in one direction it would substantially coincide with the other.

The word "rubber" herein is used to include synthetic rubber and suitable rubber substitutes.

The irreversible drive types of coupling, shown for example in Figures 1 and 4, have the additional advantage when used in the driving system of a vehicle (where it may conveniently be secured as a flexible centre in a clutch plate or member) that the coupling is capable of dealing with the different vibrational frequencies of the vehicle when being driven and when overrunning its engine. In the drive position as made clear above, the inner member drives the outer member of the coupling with the rubber loaded in shear and compression as already discussed, but in the over-running condition the outer member will be turning the inner member and the rubber will be loaded in shear and tension.

I claim:

1. An elastic coupling for rotary members loaded in torsion comprising inner and outer members, the inner member having circumferentially extending but circumferentially separated surface segments, the outer member similarly having a like number of circumferentially extending but circumferentially separated surface segments, each of the surface segments on one member mating with and having substantially the same circumferential contour with relation to the axis of the coupling as an adjacent surface segment on the other member but being displaced circumferentially therefrom in one direction when the coupling is not in torsion so as to provide a space radially between them, and rubber radially extending between each pair of mating surface segments and bonded thereto.

2. An elastic coupling for rotary members loaded in torsion comprising inner and outer members, the inner member having circumferentially extending but circumferentially separated surface segments, the outer member similarly having a like number of circumferentially extending but circumferentially separated surface segments, each of the surface segments on one member mating with and having substantially the same circumferential contour with relation to the axis of the coupling as an adjacent surface segment on the other member but being displaced circumferentially therefrom in one direction when the coupling is not in torsion so as to provide a space radially between them, and rubber radially between each pair of mating surface segments and bonded thereto, the relation of the surface segments being such approximately that if one member were turned sufficiently in one direction relative to the other without the rubber being present, the surface segments on one member would move into substantially fitting relation to the surface segments on the other member respectively.

3. Elastic coupling of the kind having an inner member with projecting parts and an outer annular member with concave parts and with rubber bonded to the respective surfaces of these parts, wherein the curved concave faces of the annular member are generated from centres symmetrically off-set from the axis of the member (which is that of the coupling), and wherein the inner member which is radially spaced from the annular member is a ratchet-wheel-like member with the number of convexly curved faces corresponding to the concave faces of the annular member, the concave faces and the convex surfaces having the same radius of curvature with the centers of curvature located on a circle centered on the axis of the coupling, the spaces between the convex and concave surfaces being occupied by rubber.

4. An elastic coupling for rotary members loaded in torsion comprising inner and outer members, the inner member having circumferentially extending but circumferentially separated surface segments, the outer member similarly having a like number of circumferentially extending but circumferentially separated surface segments, each of the surface segments on one member mating with and having substantially the same circumferential contour with relation to the axis of the coupling as an adjacent surface segment on the other member, the surfaces of each mating pair of surface segments being arcuate circumferentially of the axis of the coupling but being relatively displaced in a circumferential direction so as to have a space radially between them, and rubber between each mating pair of surfaces and bonded thereto.

5. An elastic coupling for rotary members loaded in torsion comprising inner and outer members, the inner member having circumferentially extending but circumferentially separated surface segments, the outer member similarly having a like number of circumferentially extending but circumferentially separated surface segments, each of the surface segments on one member mating with and having substantially the same circumferential contour with relation to the axis of the coupling as an adjacent surface segment on the other member, the surfaces of each mating pair of surface segments being curved circumferentially of the axis of the coupling with the axes of curvature of each pair substantially parallel to the axis of the coupling but relatively displaced circumferentially on a circle having its center on the axis of the coupling.

6. An elastic coupling for rotary members loaded in torsion comprising inner and outer members, the inner member having circumferentially extending but circumferentially separated surface segments, the outer member similarly having a like number of circumferentially extending but circumferentially separated surface segments, each of the surface segments on one member mating with and having substantially the same circumferential contour with relation to the axis of the coupling as an adjacent surface segment on the other member, the surfaces of each mating pair of surface segments being arcuate circumferentially of the axis of the coupling but being relatively displaced in a circumferential direction so as to provide a space radially between them, and rubber between each mating pair of surfaces and bonded thereto, the relation of the surface segments being such approximately that if one member were turned sufficiently in one direction relative to the other without the rubber being present, the surface segments on one member would move into substantially fitting relation to the surface segments on the other member, respectively.

7. An elastic coupling for rotary members loaded in torsion comprising inner and outer members, the inner member having circumferentially extending but circumferentially separated surface segments, the outer member similarly having a like number of circumferentially extending but circumferentially separated surface segments, each of the surface segments on one member mating with and having substantially the same circumferential contour with relation to the axis of the coupling as an adjacent surface segment on the other member but being displaced circumferentially therefrom in one direction when the coupling is not in torsion so as to provide a space radially between them, and rubber radially between each pair of mating surface segments and bonded thereto, the relation of the surface segments of each pair being such approximately that they converge circumferentially in one direction when the members are not in torsion but if one member is turned relative to the other in that one direction sufficiently without the rubber being present, one of the surface segments would move substantially into fitting relation to the other.

8. An elastic coupling for rotary members loaded in torsion comprising inner and outer members, the inner member having circumferentially extending but circumferentially separated surface segments, the outer member similiarly having a like number of circumferentially extending but circumferentially separated surface segments, each of the surface segments on the members being curved circumferentially of the axis of the coupling and each surface segment on one member mating with and having substantially the same radius of curvature as an adjacent surface segment of the other member with the axes of curvature of the mating surfaces being substantially parallel to but spaced from the axis of the coupling and also displaced relatively around the latter axis when the members are not in a state of torsion, and rubber between the surfaces of each pair of mating segments and bonded thereof.

9. An elastic coupling for rotary members loaded in torsion comprising inner and outer members, the inner member having circumferentially extending but circumferentially separated surface segments, the outer member similiarly having a like number of circumferentially extending but circumferentially separated surface segments, each of the surface segments on one member mating with and having substantially the same circumferential contour with relation to the axis of the coupling as an adjacent surface segment on the other member but being displaced circumferentially therefrom in one direction when the coupling is not in torsion so as to provide a space radially between them, and rubber radially between each pair of mating surface segments and bonded thereto, the relation of the surface segments being such approximately that if one member were turned sufficiently from the no torsion position in one direction relative to the other without the rubber being present, the surface segments on one member would move into substantially parallel relation to the surface segments on the other member, respectively.

10. An elastic coupling for rotary members loaded in torsion comprising inner and outer members, the inner member having circumferentially extending but circumferentially separated surface segments, the outer member similarly having a like number of circumferentially extending but circumferentially separated surface segments, each of the surface segments on one member mating with and having substantially the same circumferential contour with relation to the axis of the coupling as an adjacent surface segment on the other member but being displaced circumferentially therefrom in one direction when the coupling is not in torsion so as to provide a space radially between them, rubber radially between each pair of mating surface segments and bonded thereto, the relation of the surface segments being such approximately that if one member were turned sufficiently in one direction relative to the other without the rubber being present, the surface segments on one member would move into substantially fitting relation to the surface segments on the other member respectively, and radially overlapping shoulders on the members respectively at the circumferential ends of each pair of mating surfaces for providing a drive between the members if said one member is turned in a reversed direction relative to said other member.

11. An elastic coupling for rotary members loaded in torsion comprising inner and outer members, the inner member having circumferentially extending but circumferentialy separated surface segments, the outer member similarly having a like number of circumferentially extending but circumferentially separated surface segments, each of the surface segments on one member mating with and having substantially the same circumferential contour with relation to the axis of the coupling as an adjacent surface segment on the other member but being displaced circumferentially therefrom in one direction when the coupling is not in torsion so as to provide a space radially between them, rubber radially between each pair of mating surface segments and bonded thereto, the relation of the surface segments of each pair being such approximately that they converge circumferentially in one direction when the members are not in torsion but if one member is turned relative to the other in that one direction sufficiently without the rubber being present, one of the surface segments would move substantially into fitting relation to the other, and radially overlapping shoulders on the members respectively, at the circumferential ends of each pair of mating surfaces for providing a drive between the members if said one member is turned in a reversed direction relative to said other member.

12. An elastic coupling for rotary members loaded in torsion comprising inner and outer members, the inner member having circumferentially extending but circumferentially separated surface segments, the outer member similarly having a like number of circumferentially extending but circumferentially separated surface segments, each surface segment on one member mating with an adjacent surface segment on the other member and the surface segments of each mating pair having substantially the same circumferential contour but being relatively displaced circumferentially when the coupling is not in torsion, and rubber radially between each pair of surface segments and bonded thereto, the surface segments of certain mating pairs being such approximately that if one member is turned sufficiently in one direction relative to the other without the rubber being present, the two mating surfaces of each of such certain pairs would move into substantially fitting relation, and the surface segments of other mating pairs being such that if said one member is turned sufficiently in the other direction relative to the other without the rubber being present, the two mating surfaces of each of such other pairs would move into substantially fitting relation.

MAX GOLDSCHMIDT.